Figure 1:
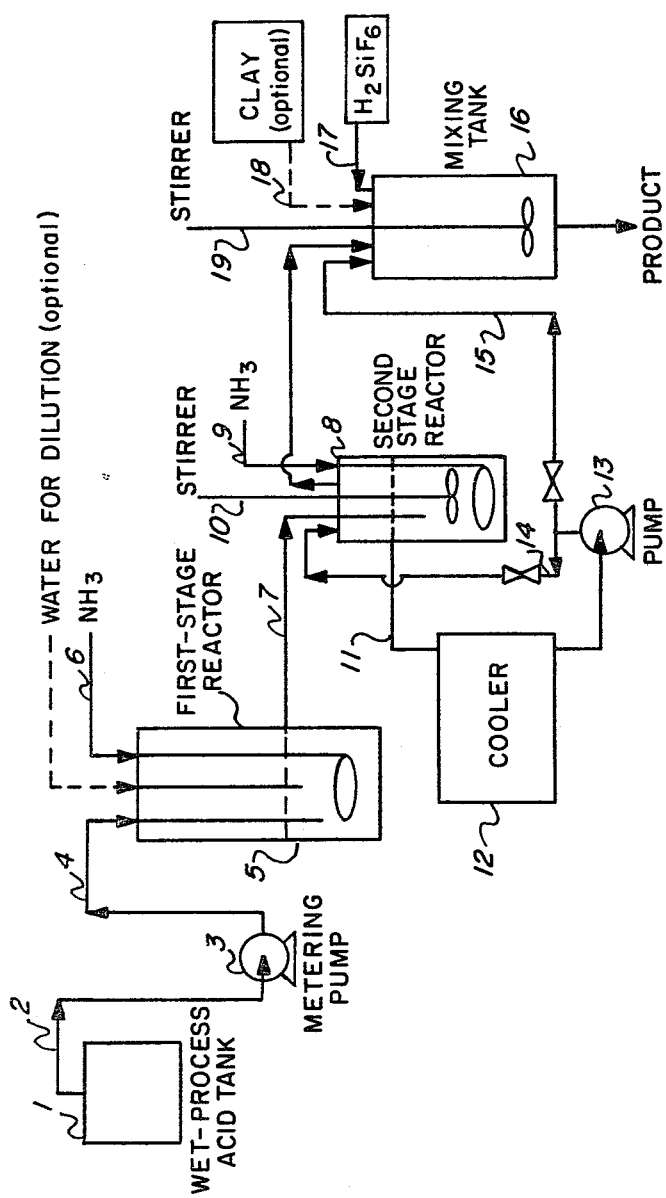

United States Patent [19]

Jones et al.

[11] 4,375,980
[45] Mar. 8, 1983

[54] PRODUCTION OF SUSPENSION FERTILIZERS FROM ORTHOPHORPHORIC ACID

[75] Inventors: Thomas M. Jones; John M. Stinson, both of Sheffield, Ala.

[73] Assignee: Tennessee Valley Authority, Muscle Shoals, Ala.

[21] Appl. No.: 21,879

[22] Filed: Mar. 19, 1979

Related U.S. Application Data

[63] Continuation of Ser. No. 947,684, Oct. 2, 1978, now Defensive Publication No. T986,001.

[51] Int. Cl.³ .............................................. C05B 7/00
[52] U.S. Cl. .................................... 71/34; 71/43; 71/64.08; 423/310; 423/313
[58] Field of Search ............... 71/34, 43, 64 C, 68.08, 71/37; 423/310, 313, 301

[56] References Cited

U.S. PATENT DOCUMENTS

| | | | |
|---|---|---|---|
| 1,699,234 | 1/1929 | Gaus et al. | 71/34 X |
| 3,024,100 | 3/1962 | Langguth et al. | 71/64 C X |
| 3,493,336 | 2/1970 | Milling | 423/313 X |
| 3,813,233 | 5/1974 | Kendrick | 71/34 |
| 3,861,897 | 1/1975 | Frazier | 71/34 |
| 4,063,920 | 12/1977 | Weston | 71/34 |
| 4,066,432 | 1/1978 | Jones | 71/34 |
| 4,137,063 | 1/1979 | Sardisco | 423/313 X |

FOREIGN PATENT DOCUMENTS

| | | | |
|---|---|---|---|
| 1480486 | 7/1977 | United Kingdom | 71/43 |
| 559894 | 6/1977 | U.S.S.R. | 423/313 |

Primary Examiner—Ferris H. Lander
Attorney, Agent, or Firm—Robert A. Petrusek

[57] ABSTRACT

An improved process for the production of concentrated, high-grade, nitrogen-phosphate (N—$P_2O_5$) base suspension fertilizer from wet-process or other phosphoric acids and ammonia. The process involves addition of small proportions of fluosilicic acid during preparation of the suspension to cause modification of monoammonium phosphate crystals to shapes and sizes that do not settle during vibration such as occurs during shipment.

4 Claims, 1 Drawing Figure

PRODUCTION OF AMMONIUM PHOSPHATE SUSPENSION FERTILIZERS BY
A TWO-STAGE CONTINUOUS AMMONIATION PROCESS

PRODUCTION OF AMMONIUM PHOSPHATE SUSPENSION FERTILIZERS BY A TWO-STAGE CONTINUOUS AMMONIATION PROCESS

PRODUCTION OF SUSPENSION FERTILIZERS FROM ORTHOPHORPHORIC ACID

The invention herein described may be manufactured and used by or for the Government for governmental purposes without the payment to us of any royalty therefor.

This is a continuation of application Ser. No. 947,684, filed Oct. 2, 1978, for PRODUCTION OF SUSPENSION FERTILIZERS FROM ORTHOPHOSPHORIC ACID now Defensive Publication No. T986,001, published Sept. 4, 1979.

Our invention relates to improvements in the process for producing high-analysis nitrogen-phosphate (N—P$_2$O$_5$) suspension fertilizers from orthophosphoric acid (see U.S. Pat. No. 3,813,233, Kendrick, and U.S. Pat. No. 4,066,432, Jones) and products therefrom. In particular, it relates to production of free flowing high-analysis orthophosphate suspension fertilizers that have small crystals, excellent shipping properties, and long-term storage characteristics. More particularly, our invention relates to a novel process for producing orthophosphate suspension fertilizer by reaction of ammonia with impure wet-process or other orthophosphoric acids to form concentrated suspension fertilizer products with excellent flow properties and with thin, needlelike crystals of monoammonium phosphate or both monoammonium and diammonium phosphate that do not settle when the suspension is subjected to vibration such as occurs during shipment. Still more particularly, our invention relates to a novel method of producing concentrated orthophosphate suspension fertilizer which consists of ammoniating merchant-grade wet-process or other orthophosphoric acids within the N:P$_2$O$_5$ weight ratio range where monoammonium phosphate or both monoammonium and diammonium phosphate are stable solid phases and then adding a crystal modifier for production of monoammonium phosphate crystals of needlelike shape that unexpectedly do not settle during vibration such as occurs during transit. Our process operates in such a manner to produce orthophosphate base suspension fertilizers with N:P$_2$O$_5$ weight ratios in the most appropriate range for allowing high concentration, low viscosity, and excellent flow characteristics. The products are eminently suitable for shipment, long-term storage, and for use in preparation of mixed-grade suspensions of high grade and of various N:P$_2$O$_5$:K$_2$O ratios, where heretofore only base suspensions with higher N:P$_2$O$_5$ ratios and lower phosphate grade (no crystalline monoammonium phosphate) have been used successfully to avoid settling of crystals during vibration.

The art of producing fluid fertilizers, both liquids and suspensions, is well known and is fully described in the literature. See, for examples, the following patents and publications.

| U.S. Pat. No. | Author | Date |
|---|---|---|
| 2,950,961 | Striplin et al | August 30, 1960 |
| 3,015,552 | Striplin et al | January 2, 1962 |
| 3,096,170 | Newsome | July 2, 1963 |
| 3,109,729 | Slack et al | November 5, 1963 |
| 3,113,858 | Slack et al | December 10, 1963 |
| 3,148,970 | Smith et al | September 15, 1964 |
| 3,192,013 | Young | June 29, 1965 |
| 3,234,004 | Smith et al | February 8, 1966 |
| 3,326,666 | Walters | June 20, 1967 |
| 3,382,059 | Getsinger | May 7, 1968 |
| 3,697,247 | Jones et al | October 10, 1972 |
| 3,813,233 | Kendrick | May 28, 1974 |
| 4,066,432 | Jones | January 3, 1978 | also Defensive Publication No. T889,024, Jones et al., Aug. 31, 1971, and Defensive Publication No. T900,026, Jones, July 25, 1972.

The most common method of producing fluid fertilizers containing both nitrogen and phosphorus is by ammoniation of phosphoric acids. In the early 1950's, electric-furnace orthophosphoric acid, which is relatively free of impurities, was ammoniated to form 8-24-0 grade liquid fertilizer. Subsequently, it was demonstrated that superphosphoric acid could be produced and used in preparing solutions of higher grades such as 10-34-0 and 11-37-0. Later, suspension fertilizers which contain crystals of fertilizer salts suspended in saturated solutions were developed, and higher grades of fluid fertilizers than were available in the prior art were prepared commercially. Nitrogen compounds, such as urea, ammonium nitrate, ammonium sulfate, or ureaammonium nitrate solution, and potassium compounds, such as potassium chloride, sulfate, etc., were added to the ammoniated phosphoric acid solutions and suspensions to give mixed fluid fertilizers with various ratios and grades.

A large part of the suspension fertilizers being produced at the present time that have both high analyses and satisfactory long-term shipping and storage properties contain polyphosphates. These suspension fertilizers, which are almost as high in grade as solid products, are made from superphosphoric acid which contains substantial amounts of pyro and more condensed species of polyphosphates, e.g., tripoly, etc., or from wet-process orthophosphoric acid with superphosphoric acid added to sequester the congeneric impurities. These suspension fertilizers display certain distinct advantages over dry mixes in that costs of handling and storage are less, and distribution of the fertilizers or fertilizers containing pesticides is simplified with more even distribution to the soil being obtained.

Raw material costs for fluid fertilizers containing polyphosphates have been relatively high, however, the fluids containing polyphosphates, in many instances, have had difficulty competing, strictly on an economical basis, with solid fertilizers. Since wet-process merchant-grade phosphoric acid costs less per unit of P$_2$O$_5$ than superphosphoric acids, which contain polyphosphates that sequester impurities, or electric furnace orthophosphoric acids, which contain little or no impurities, the use of orthophosphoric merchant-grade wet-process acid as the sole source of phosphate in preparation of suspension fertilizers has often been attempted. However, the grades of these suspension fertilizers were lower because of numerous factors, including the presence of impurities which precipitate as amorphous compounds with gel-like characteristics when such acids were ammoniated and formation of ammonium phosphate crystals that settle to the bottom of the container during vibration. The gelatinous properties of the precipitated impurities often completely destroyed the fluidity of the high-grade products and made it necessary to dilute them with water to low grade at the time of production to prevent excessive thickening or gelation in pumps, pipelines, and storage tanks. Once the material in the pumps, pipelines, valves, tanks, etc. attain semisolid condition, it is extremely difficult to restore the fluidity. Also, crystals, that settle during vibration such as occurs during transit, adhere to the bottom of their container and are very difficult to resuspend or remove from tank cars or other containers. Furthermore, these intolerable characteristics gain in intensity with both storage time and decrease in temperature.

Of the various methods and means available to the industry for manufacturing liquid fertilizer solutions and/or suspensions from wet-process phosphoric acid and in consideration of all of the factors involved, such as costs of manufacturing, transportation, application to the soil, and characteristics of the fertilizers to store well, three routes from phosphate rock to such fluid fertilizers probably are the most economical of the many known processes.

One of the routes is the use of the direct process (such as in Getsinger '059, supra) using the heat of ammoniation to convert merchant-grade wet-process orthophosphoric acid to an ammonium polyphosphate melt or possibly solution or suspension in preference to using the indirect process (as in Young '013, supra) of separately concentrating the acid by application of heat, then to be followed by the later ammoniation thereof.

Another major route (as in Striplin et al. '552, supra) is to start with merchant-grade wet-process phosphoric acid (about 54 percent $P_2O_5$) and ammoniate it under conditions referred to by both Young and Getsinger as prior art and add a polyphosphate as a sequestrant. Such ammoniation without polyphosphate yields a thick pasty semisolid normally characterized by properties which are undesirable and make it unwieldy to handle; or alternatively, a dilute, low-grade fluid is made. Since the ammoniated product becomes more viscous and more unwieldy with storage time and temperature, the problem is more serious because the gel-like product acts as a solid in valves, pipes, storage tanks, etc. Drastic measures may be required for removal of the solid products because dilution with water is more difficult once the product has developed to the solid state. However, a clear liquid grade (10-34-0) or a suspension grade (13-30-0, 1.5 percent clay) that will store satisfactorily for 90 days or longer at 80° F. and 100° F. may be prepared from the hot freshly ammoniated acid by adding an ammoniated superphosphoric acid material such as 12-40-0 or 11-37-0 in amounts to supply about 40 percent of the total phosphate as polyphosphate and then diluting with water to the proper grade. However, polyphosphate is a necessary and an essential ingredient of the high-grade fertilizer products. It is further noted that by either procedure, addition of polyphosphate adds to the cost of the fertilizer.

The third major route is the direct multistage ammoniation process (as in Kendrick U.S. Pat. No. 3,813,233 and in Jones U.S. Pat. No. 4,066,432, supra) whereby concentrated orthophosphate suspensions are prepared by ammoniation of impure wet-process or other phosphoric acids. The production of concentrated ammonium orthophosphate suspensions with N:$P_2O_5$ weight ratios of 0.25 to 0.34, that contain metallic impurity compounds without gel-like properties is fully described in U.S. Pat. No. 3,813,233, Kendrick. These suspensions have excellent long-term storage characteristics when stored under static conditions; but under conditions of vibration such as occurs during transit by rail, a large proportion of the crystals in the suspensions settle and adhere to the bottom of the tank car or other container as heavy crusts that are very difficult to remove. This intolerable condition makes the process unattractive. Later, a novel method for prevention of settling of crystals in the suspensions during vibration was discovered and is fully described in U.S. Pat. No. 4,066,432, Jones. By this new procedure, orthophosphate suspensions with high analysis, free from metallic impurity gel-like compounds, and with satisfactorily low viscosity at temperatures of about 32° F., or above, and with excellent shipping and long-term storage properties are now being produced from impure, merchant-grade, wet-process acids by ammoniation of the acid in three stages. However, the disadvantages of using this three-stage ammoniation process instead of the former two-stage are (1) an extra stage is required, (2) the products have higher N:$P_2O_5$ weight ratios (0.34 to 0.37 vs. 0.27 to 0.34) which necessitate removal of more heat during processing, and (3) solubility of the ammonium phosphates in the suspension fertilizers is somewhat lower with the higher N:$P_2O_5$ ratios which increases the viscosity and limits the phosphate content to about 38 percent $P_2O_5$ instead of 39 to 40 percent and thus increases transportation costs per unit of $P_2O_5$. Our present invention for production of high-analysis suspension fertilizer from low-cost wet-process or other impure phosphoric acids adds to, opens up, and makes workable the former two-stage route for producing high-quality suspension fertilizers.

It is therefore the principal object of our present invention to produce, by a simple economical two-stage procedure, fluid ammonium phosphate suspensions that have high concentration, low N:$P_2O_5$ weight ratio, and good shipping and storage properties from low-cost raw materials such as impure wet-process orthophosphoric acid. A further objective is to produce, from low-cost raw materials, fluid orthophosphate suspension fertilizer with N:$P_2O_5$ weight ratios in the range of about 0.27 to 0.33 that contains crystals that do not settle, pack, or adhere to the bottom of railroad tank cars or other shipping containers during transit and that do not contain gels that cause high viscosity and poor flow characteristics.

A still further object is to produce fluid, high-analysis suspensions with both good shipping and good storage properties without sacrifice in quantity, grade, or versatility.

Still further and more general objects and advantages of the present invention will appear from the more detailed description that we have set forth in the following flowsheet and examples.

We have discovered an unexpected novel method for producing orthophosphate suspensions containing both high $P_2O_5$ content and either monoammonium phosphate crystals or both monoammonium diammonium phosphate crystals (N:$P_2O_5$ weight ratio about 0.27 to 0.33) that are of size and shape that do not settle during vibration such as occurs during shipment. We have discovered that when impure wet-process orthophosphoric acids are reacted with ammonia by the two-stage process to form ammonium phosphate crystal nuclei, a small proportion of fluosilicic acid, added under the proper conditions, will unexpectedly cause the monoammonium phosphate crystals to grow into thin needlelike instead of the usual thick rod or beamlike shapes. Unexpectedly, when the suspensions are subjected to vibration such as occurs in shipment, the thin needlelike crystals will not settle. There is no sacrifice in product grade, quality, versatility, or storage properties as compared with suspensions produced by the former two-stage process and there is very little added production cost resulting from addition of our crystal modifier.

The theory behind our invention is that high-analysis suspension fertilizers must be manufactured with an abundance of small, thin equilibrium-type crystals otherwise they will settle during vibration such, for example, so that which occurs during transit by rail. Furthermore, because of the abundance of small thin crystals, none will grow excessively large or thick during storage or changes in temperature. Orthophosphate suspensions with $N:P_2O_5$ weight ratios in the range of 0.27 to 0.33 have high solubility of ammonium phosphate which causes increase in the density of the solution phase and decrease in viscosity of the suspension. The solid portion of the suspension may consist of metallic impurities together with either monoammonium phosphate crystals alone or both monoammonium and diammonium phosphate crystals, depending upon the $N:P_2O_5$ ratio and to a lesser degree the temperature of the suspension fertilizer. In products made by the two-stage process as taught by Kendrick '233, supra, the metallic impurity crystals which are extremely small do not settle during transit by rail, form gel-like materials, or otherwise cause trouble. The thin diammonium phosphate crystals produced at $N:P_2O_5$ ratios below about 34 also do not settle during vibration such as occurs during transit by rail because they are platelike in shape (for example, 20×600×600 microns) and they are only a little more dense than the solution phase, both of which help prevent settling during vibration. However, the monoammonium phosphate crystals settle readily during transit by rail because they are rodlike shape (for example, 150×150×600 microns) and are more dense than diammonium phosphate. The monoammonium phosphate crystals not only settle, they also pack together during transit and then cement themselves together on the bottom of their container causing their presence to be intolerable. However, heretofore no method was known for altering the size or shape of these crystals so that they would remain suspended; therefore, a third ammoniation stage was installed, as taught by Jones '432 supra, in which the monoammonium phosphate was eliminated from the system. We have now found a modifier for the monoammonium phosphate crystals which makes the third ammoniation stage unnecessary. With use of the crystal modifier, which is fluosilicic acid or other fluorine or silica compounds, the monoammonium phosphate crystals are formed in thin needlelike shape instead of thick rod or beamlike shape. The new thin needlelike crystals do not settle from the suspensions and pack and adhere to the bottom of the container during vibration such as occurs during shipment by rail. Furthermore, the shape and size of the diammonium phosphate and the metallic impurity crystals, which are already satisfactory, are not significantly affected by the presence of the fluosilicic acid crystal modifier.

Our new process consists of ammoniating wet-process orthophosphoric acid in a first-stage boiling reactor to $N:P_2O_5$ weight ratios from 0.20 to 0.23 for prevention of formation of gel-like metallic impurity compounds. In a second stage, the partially ammoniated acid is simultaneously cooled to the range of 190° to 230° F. (200°–210° F. being preferred and further ammoniated to the $N:P_2O_5$ weight ratio range of about 0.27 to 0.33 (0.28–0.32 being preferred). The material from the second stage, which contains no ammonium phosphate crystals, is quenched in a cooler operated in the range of 90° to 140° F. (100°–130° F. being preferred) for production of a slurry containing an abundance of monoammonium phosphate or both monoammonium and diammonium phosphate crystal nuclei (dependent upon the $N:P_2O_5$ weight ratio and the temperature). In a mixer which follows the cooler, fluosilicic acid (0.1 to 0.5 percent $H_2SiF_6$ by weight) and suspending clay (0 to 3.0 percent by weight) are added simultaneously and thoroughly mixed with the warm slurry from the cooler. The concentration of fluosilicic acid used in our process is not important as long as the proper proportions of $H_2SiF_6$ are added. Commercial-grade fluosilicic acid such as that produced as a byproduct in many plants for producing phosphoric acid may be used. Mixing was achieved by stirring the components for 30 minutes with a turbine-type agitator; other types of agitation, however, should be suitable. The proportion of fluosilicic acid that is necessary for prevention of vibrational settling is dependent on $P_2O_5$ content and $N:P_2O_5$ ratio of the suspension and on the amount of clay that is added. The preferred amount of fluosilicic acid is in the range of 0.3 to 0.4 weight percent $H_2SiF_6$, and about 1 percent clay is preferred. However, if the proportion of $H_2SiF_6$ is increased to 0.5 percent, satisfactory product can be made without a clay. These percentages are based on the total weight of the finished suspension. For proper modification of the crystals, the fluosilicic acid should be added after all of the ammonia has been added and before the slurry was cooled. The fluosilicic acid must be added to the warm slurry because once the monoammonium phophate crystals have grown into thick rodlike shape, adding the fluosilicic acid will not change their shape. Also, if ammonia is added to the warm slurry after the fluosilicic acid, the two apparently react and the effectiveness of the fluosilicic acid as a crystal modifier is decreased.

Our invention, together with further objectives and advantages thereof, will be better understood from a consideration of the following drawing, descriptions and illustrative examples.

Referring now to the single FIGURE of the accompanying drawing, which represents a diagrammatic flowsheet illustrating the process of our invention, substantially all of the impure wet-process orthophosphoric acid employed is fed from tank 1 through line 2 to metering pump 3 and on through line 4 to first-stage reactor 5. Ammonia gas is fed from a source not shown to first-stage reactor 5 through line 6. Water for dilution, also from a source not shown, is introduced into first-stage reactor 5 as indicated. The ammonia is distributed at the bottom of first-stage reactor 5 through a sparger illustrated as located just below the wet-process orthophosphoric acid inlet. Partially ammoniated wet-process acid from first-stage reactor 5 overflows through line 7 into second-stage reactor 8. Ammonia gas is fed through line 9 to second-stage reactor 8 and distributed through a sparger located at the bottom just below stirrer 10. Material from second-stage reactor 8 overflows through line 11 to cooler 12 and is recirculated by pump 13 to second-stage reactor 8 through line 14. Material also is pumped through line 15 to mixing tank 16. Clay is fed from a source not shown through conveyor 18 to mixing tank 16. Fluosilicic acid solution is fed from a source not shown through line 17 to mixing tank 16. The resulting wet-process acid-ammonia product, clay, and fluosilicic solution are intimately mixed with stirrer 19 and the product suspension is discharged to storage through line 20.

In carrying out the objects of our invention, we have found that high-grade ammonium orthophosphate suspension fertilizer with both excellent storage and shipping properties can be prepared by ammoniation of impure merchant-grade wet-process or other phosphoric acids. We have further found that with use of our crystal modifier and with proper control of the process variables, high-grade suspensions that are satisfactory in every respect can be prepared by ammoniating the acid in only two stages as described by Kendrick '233 supra.

Various fertilizer materials, such as nitrogen solutions, nitrogen-containing solids, phosphate-containing solids or potassium-containing solids can be incorporated with our base suspension to produce three-component ($N-P_2O_5-K_2O$) suspensions of satisfactory properties. In addition, other nutrient sources, such as micronutrient or sulfur-containing sources, may be incorporated in the resultant three-component suspensions.

EXAMPLE I

The effect of fluosilicic acid ($H_2SiF_6$), our crystal modifier, on size and shape of ammonium phosphate crystals in orthophosphate suspensions containing about 39 percent $P_2O_5$ and $N:P_2O_5$ weight ratios in the range of 0.27 to 0.33 is illustrated in this example. The suspensions containing crystals of the dimensions shown in Table I, infra, were prepared by our two-stage process from ammonia gas and wet-process orthophosphoric acid derived from central Florida phosphate ore. The acid which was produced in a commercial production facility had the following chemical analysis: 53.8 percent $P_2O_5$, 3.1 percent $SO_4$, 1.4 percent $Al_2O_3$, 1.5 percent $Fe_2O_3$, 0.59 percent $MgO$, and 1.0 percent F.[a] suspension with a grade of about 11-39-0 after addition of about 200° to 220° F., which is above the saturation temperature for ammonium orthophosphates, $N:P_2O_5$ weight ratio in the range of 0.27 to 0.33, and retention time of about 10 to 20 minutes. The conditions for the cooler and clay mixer which followed the second stage were: temperature of the cooler, 100° to 120° F., and retention time, about 10 to 20 minutes; temperature in the clay mixer, 100° to 120° F. and retention time, 30 minutes. In each test, two portions of slurry were taken from the cooler. To one portion, our crystal modifier (about 0.30 weight percent of $H_2SiF_6$) and attapulgite clay (1 percent by weight) were added and thoroughly mixed to form the final suspension product. To the other portion 1.5 percent by weight of clay (no $H_2SiF_6$) was added and mixed with the slurry.

[a]The acid was diluted to about 38 percent in the first stage.

Results from the tests are shown in Table I below. The results show the "effective upper limit in crystal size" which means that only about 1 percent of the crystals were larger than this size and 99 percent were smaller. Without the crystal modifier present, all of the monoammonium phosphate crystals were rod or beam-like in shape, but in every test with the crystal modifier present, two dimensions (depth and breadth) of all of the monoammonium phosphate crystals were much smaller and the crystals were thin and needlelike in shape. The thin, needlelike crystals resist settling much more than thick rodlike crystals. The diammonium phosphate crystals which were thin and platelike in shape and did not settle readily were unaffected by addition of the fluosilicic acid crystal modifier. However, they did increase in thickness with increase in $N:P_2O_5$ weight ratio above $N:P_2O_5$ ratio about 0.320, and it would be expected that the size (thickness) of the diammonium phosphate crystals would be so large that they would settle in suspensions with $N:P_2O_5$ ratios higher than our range of 0.27 to 0.33.

TABLE I

Effect of Fluosilicic Acid ($H_2SiF_6$)[a]
On Size and Shape of Ammonium Orthophosphate Crystals

| $N:P_2O_5$ ratio | Effective upper limit[b] in crystal size | | | |
|---|---|---|---|---|
| | MAP crystals | | DAP crystals | |
| | With $H_2SiF_6$ | Without $H_2SiF_6$ | With $H_2SiF_6$ | Without $H_2SiF_6$ |
| 0.270 | 20 × 20 × 1200 | 200 × 200 × 800 | 20 × 300 × 500 | 20 × 300 × 500 |
| 0.274 | 20 × 20 × 1200 | 350 × 350 × 1300 | 20 × 300 × 400 | 20 × 500 × 600 |
| 0.280 | 20 × 20 × 1200 | 300 × 300 × 1000 | 20 × 300 × 600 | 30 × 500 × 800 |
| 0.288 | 20 × 20 × 1400 | 300 × 300 × 500 | 20 × 300 × 600 | 20 × 400 × 600 |
| 0.292 | 50 × 50 × 900 | 200 × 200 × 500 | 50 × 400 × 800 | 30 × 600 × 900 |
| 0.296 | 25 × 25 × 1000 | 200 × 200 × 800 | 25 × 400 × 700 | 25 × 400 × 600 |
| 0.298 | 10 × 10 × 600 | 200 × 200 × 500 | 20 × 300 × 400 | 20 × 300 × 300 |
| 0.302 | 20 × 20 × 1000 | 200 × 200 × 600 | 30 × 400 × 500 | 30 × 400 × 500 |
| 0.305 | 10 × 10 × 800 | 150 × 150 × 400 | 30 × 400 × 500 | 30 × 300 × 500 |
| 0.308 | 10 × 10 × 600 | 150 × 150 × 500 | 30 × 300 × 500 | 30 × 300 × 500 |
| 0.312 | 25 × 25 × 1000 | 200 × 200 × 500 | 30 × 600 × 800 | 30 × 600 × 800 |
| 0.317 | 15 × 15 × 900 | 150 × 150 × 500 | 30 × 300 × 500 | 30 × 300 × 500 |
| 0.320 | 25 × 25 × 700 | 150 × 150 × 400 | 40 × 600 × 800 | 40 × 700 × 800 |
| 0.323 | 10 × 10 × 500 | 100 × 100 × 400 | 40 × 500 × 800 | 40 × 500 × 800 |
| 0.325 | 10 × 10 × 500 | 100 × 100 × 400 | 50 × 500 × 900 | 50 × 500 × 900 |
| 0.328 | 50 × 50 × 1200 | 600 × 600 × 1300 | 50 × 800 × 1200 | 50 × 800 × 1200 |

[a]The slurries from the cooler were divided into two parts. To one part was added 0.3 percent by weight of $H_2SiF_6$ and 1.0 percent by weight of attapulgite clay; to the other part was added 1.5 percent clay and no $H_2SiF_6$.
[b]Effective upper limit means that about 99 percent of the crystals are this size or smaller; 1 percent are larger.

of 1.0 percent clay were produced. Our improved two-stage ammoniation process was operated under the following conditions. In the first-stage reactor, the conditions were: boiling temperature (about 225°–230° F.), $N:P_2O_5$ weight ratio of 0.20 to 0.23, and retention time in the range of 30 to 60 minutes. In the second-stage reactor, the conditions were: temperature in the range

EXAMPLE II

This example illustrates the effect of proportion of fluosilicic acid on suspension viscosity, vibrational settling, and size of the crystals. The suspensions contained about 37 to 39 percent $P_2O_5$, 1.0 percent attapulgite clay, and the N:P$_2$O$_5$ weight ratios were in the range of about 0.29 to 0.33. The viscosity of the suspensions was measured with a Brookfield viscometer (Model LVT). Before the viscosity measurements were made, the suspensions were agitated for a period of 5 minutes with a propeller-type stirrer operated at a tip speed of 7 feet per second to break the gel. Vibrational settling was measured with an improved laboratory shaker which simulated the effects of shipment of suspensions in railroad tank cars. The equipment was fabricated by modifying an electromagnetic sieve shaker. A metal pan was bolted to the metal plate on top of the vibrator. The pan was divided into eight compartments each of which was capable of holding an 8-ounce sample bottle three-fourths full of suspension. The intensity of vibration was set at a constant value found by experience to simulate settling that occurs during transit by rail. The proportion that settled during the 3-hour settling test was reported in percent by volume. The crystal size was measured by petrographic analyses and reported as the effective upper limit, which means that 99 percent of the crystals in the suspension were of this size or smaller. The suspensions from which the data were obtained (Table III,infra) were prepared from central Florida wet-process orthophosphoric acid by our two-stage process operated under the conditions shown in Example I, supra.

The results obtained from the tests (Table II, infra) indicate that with the added fluosilicic acid equal to as much as 0.7 percent by weight, the viscosity of the suspensions exceeded 1000 centipoises at 80° F., which is considered excessive. With up to 0.5 percent added, the viscosity ranged from 250 to 500 centipoises, which is within the satisfactory range. No settling of crystals occurred during vibration such as occurs during transit by rail when the products contained 0.3 percent by weight or more of added fluosilicic acid. With less (0.25 percent) fluosilicic acid added to the suspensions, a few crystals occasionally settled during the vibration test. With further decreases in the proportion of added fluosilicic acid, vibrational settling increased and it exceeded the maximum limit of 2 percent by volume. With no fluosilicic acid added, settling of crystals averaged about 9 percent. The crystal size, as measured by effective upper limit increased with decrease in added fluosilicic acid between 0.4 and 0.15 percent. When the proportion of added fluosilicic acid was in the range of 0.25 to 0.5 percent, the monoammonium phosphate crystals were thin and needlelike and the effective upper limit in crystal size ranged from about 10×10×150 microns to 25×25×700 microns. With added fluosilicic acid in the range of 0.15 to 0.20 percent, the crystal size ranged from 50×50×700 microns to 75×75×600 microns. With no fluosilicic acid added, the monoammonium phosphate crystals were rodlike and their size was about 170×170×450 microns. These data show clearly that for a suspension that contains about 38 to 39 percent P$_2$O$_5$, 1.0 percent clay, and N:P$_2$O$_5$ ratio of 0.29 to 0.33 to be satisfactory, the proportion of added fluosilicic acid should be between about 0.25 and 0.5 percent by weight of the total suspension.

TABLE II

Effect of Proportion of Fluosilicic Acid Added to Suspensions with N:P$_2$O$_5$ Ratio About 0.3 and 1 Percent by Weight of Attapulgite Clay on Settling of Crystals During Vibration

| Suspension grade | H$_2$SiF$_6$ added, % by wt. | Viscosity[a] at 80° F., cP | Vibrational settling,[b] % by vol. | Effective upper limit[c] in monoammonium phosphate crystal size, micron |
|---|---|---|---|---|
| 11.5-37.0-0 | 0.7 | 3400 | 0 | 150 × 150 × 300 |
| 11.5-38.5-0 | 0.50 | 800 | 0 | 25 × 25 × 700 |
| 12.0-38.0-0 | 0.50 | 650 | 0 | — |
| 12.5-38.5-0 | 0.40 | 600 | 0 | 15 × 15 × 300 |
| 11.5-38.5-0 | 0.40 | 600 | 0 | 10 × 10 × 800 |
| 12.0-39.0-0 | 0.40 | 800 | 0 | 10 × 10 × 600 |
| 13.0-39.0-0 | 0.30 | 550 | 0 | 10 × 10 × 150 |
| 11.5-38.0-0 | 0.30 | 400 | 0 | 10 × 10 × 700 |
| 12.0-39.0-0 | 0.30 | 700 | 0 | 15 × 15 × 900 |
| 11.5-38.0-0 | 0.25 | 350 | 0 | 20 × 20 × 600 |
| 12.5-38.5-0 | 0.25 | 600 | 1.0 | 10 × 10 × 600 |
| 12.5-39.0-0 | 0.25 | 600 | 0 | 20 × 20 × 600 |
| 11.0-38.0-0 | 0.20 | 350 | 1.0 | 75 × 75 × 600 |
| 12.0-39.0-0 | 0.20 | 400 | 3.5 | — |
| 12.0-39.0-0 | 0.20 | 500 | 2.0 | 50 × 50 × 700 |
| 11.0-37.5-0 | 0.15 | 300 | 7.5 | 50 × 50 × 1500 |
| 12.5-38.0-0 | 0.15 | 400 | 7.4 | 150 × 150 × 450 |
| 12.5-39.5-0 | 0.15 | 400 | 4.5 | 75 × 75 × 600 |
| 12.5-38.5-0 | 0 | 250 | 9.5 | 170 × 170 × 410 |
| 12.0-38.5-0 | 0 | 250 | 9.5 | 170 × 170 × 480 |
| 13.0-38.0-0 | 0 | 550 | 7.4 | 500 × 500 × 2500 |

[a] The maximum satisfactory viscosity at 80° F. is considered to be 1000 centipoises.
[b] Suspensions are considered unsatisfactory if they contain 2 percent or more by volume of settled solids.
[c] Effective upper limit means that 99 percent or more of the crystals in the suspensions are this size or smaller.

EXAMPLE III

In this example, a comparison is shown of the proportions of crystals that settled during vibration in suspensions containing from 0.2 to 0.4 percent H$_2$SiF$_6$ and 1.0 percent clay with those that contained 1.5 percent clay and no H$_2$SiF$_6$. The suspensions (Table III, infra) were prepared from Florida wet-process orthophosphoric acid by our two-stage process operated under the conditions shown in Example I, supra. The results from the tests indicate that no settling of crystals occurred during vibration that simulated shipment in railroad tank cars in suspensions containing from 0.40 to 0.25 percent H$_2$SiF$_6$ and 1.0 percent clay. With less H$_2$SiF$_6$ (0.20 percent) a small amount of vibrational settling of some crystals occurred. With 1.5 percent clay, but no H$_2$SiF$_6$, excessive proportions of crystals always settled in the suspensions during vibration that simulated shipment in railroad tank cars.

TABLE III

Phosphate Base Suspension Fertilizer Made from Wet-Process Orthophosphoric Acid by a Two-Stage Ammoniation Process--Effect of H$_2$SiF$_6$ on Vibrational Settling of Crystals

| Suspension grade | H$_2$SiF$_6$ % by wt. | Clay, % by wt. | Vibrational settling at 80° F., % by vol. |
|---|---|---|---|
| 11.0-38.9-0 | 0.40 | 1.0 | 0 |
| | 0 | 1.5 | 4.6 |
| 11.2-38.9-0 | 0.40 | 1.0 | 0 |
| | 0 | 1.5 | 5.6 |
| 11.9-39.1-0 | 0.30 | 1.0 | 0 |
| | 0 | 1.5 | 6.5 |
| 11.9-38.8-0 | 0.30 | 1.0 | 0 |
| | 0 | 1.5 | 4.6 |
| 12.2-38.7-0 | 0.25 | 1.0 | 0 |
| | 0 | 1.5 | 2.5 |
| 11.8-39.5-0 | 0.25 | 1.0 | 0 |
| | 0 | 1.5 | 7.4 |
| 11.3-38.7-0 | 0.20 | 1.0 | 0 |
| | 0 | 1.5 | 2.8 |

TABLE III-continued
Phosphate Base Suspension Fertilizer Made from Wet-Process Orthophosphoric Acid by a Two-Stage Ammoniation Process--Effect of $H_2SiF_6$ on Vibrational Settling of Crystals

| Suspension grade | $H_2SiF_6$ % by wt. | Clay, % by wt. | Vibrational settling at 80° F., % by vol. |
|---|---|---|---|
| 11.9-38.8-0 | 0.20 | 1.0 | 1.9 |
|  | 0 | 1.5 | 3.7 |

EXAMPLE IV

This example (Table IV infra) indicates that settling of crystals due to vibration of the suspensions, such as encountered during shipment by rail, is affected by the point or stage of the production process at which the fluosilicic acid crystal modifier is added. The suspensions from which the data were obtained were prepared from Florida wet-process orthophosphoric acid by our two-stage ammoniation process operated under the conditions shown in Example I, supra. The results obtained from the tests (Table IV below) indicate that the crystal modifier, to be most effective in preventing vibrational settling of crystals, must be added to the slurry after it has been quenched, such as added in the clay mixer. The fluosilicic acid crystal modifier should also be added to fresh, warm slurry (about 100° to 120° F.) that is essentially saturated with respect to ammonium phosphates and contains only very small crystals or nuclei. Adding clay (1 percent) and the crystal modifier (0.3 percent $H_2SiF_6$) to warm slurry in the clay mixer produced suspensions that did not settle during vibration, whereas adding the modifier to either hot solutions (220° F.) from the second stage or to suspension that was 1 day old and at room temperature did not cause modification of the crystals or prevent crystals from settling to the bottom of the container during vibration. Also, addition of the crystal modifier to the feed acid or simultaneously with ammonia to the material in the second ammoniation stage was ineffective in preventing vibrational settling of crystals.

TABLE IV
Effect of Fluosilicic Acid (0.3 Percent by Weight) Added at Various Points or Places in the Two-Stage Ammoniation Process on Vibrational Settling of Crystals

| Suspension[a] grade | N:P₂O₅ wt. ratio | Vibrational settling, vol. % |
|---|---|---|
| Addition of $H_2SiF_6$ in Clay Mixer (100°-120° F.) | | |
| 11.1-38.7-0 | 0.287 | 0 |
| 11.3-39.2-0 | 0.286 | 0 |
| 11.2-38.6-0 | 0.290 | 0 |
| 11.6-39.6-0 | 0.293 | 0 |
| Addition of $H_2SiF_6$ to Hot Material (195°-210° F.) from Second Stage | | |
| 12.4-39.6-0 | 0.313 | 21.3 |
| 12.4-39.6-0 | 0.313 | 13.9 |
| 12.6-40.5-0 | 0.311 | 15.8 |
| 12.6-40.5-0 | 0.311 | 11.1 |
| Addition of $H_2SiF_6$ to 1-Day-Old Suspension (80° F.) | | |
| 11.4-39.0-0 | 0.292 | 3.7 |
| 12.0-39.0-0 | 0.308 | 5.6 |
| 12.3-38.8-0 | 0.317 | 11.2 |
| Addition of $H_2SiF_6$ in the Feed Acid (80° F.) | | |
| 10-8-38.7-0 | 0.279 | 18.5 |
| 11.1-39.1-0 | 0.289 | 15.7 |
| 11.4-39.0-0 | 0.292 | 12.0 |
| 11.4-38.7-0 | 0.295 | 11.1 |
| Addition of $H_2SiF_6$ Simultaneously with $NH_3$ in the Second Ammoniation Stage (200°-220° F.) | | |
| 11.4-39.5-0 | 0.289 | 16.7 |
| 11.5-39.4-0 | 0.292 | 14.8 |
| 11.7-39.7-0 | 0.295 | 14.8 |

[a]Contained 1.0 Percent by weight of attapulgite clay.

EXAMPLE V

This example illustrates the effect of storage on vibrational settling of crystals in suspensions containing 1.0 percent attapulgite clay by weight and various proportions of fluosilicic acid. The suspensions from which the data were obtained (Table V below) were prepared from Florida wet-process orthophosphoric acid by our two-stage process operated under the conditions shown in Example I supra. The results from the tests indicate that with 0.7 percent by weight of fluosilicic acid added to the suspension, no settling occurred before or after storage for 30 days at 80° F. However, addition of this large proportion of fluosilicic acid caused excessive viscosity (>1000 cP at 80° F.) in the product. With 0.3 or 0.4 percent of fluosilicic acid, which is our preferred range, there was no settling of crystals in the suspensions before or after storage for 30 days at 80° F., and the viscosity was within the satisfactory range (<1000 cP at 80° F.). With 0.25 percent fluosilicic acid added, excessive vibrational settling of crystals sometimes occurred. With less than 0.25 percent of fluosilicic acid added settling of crystals often occurred, both before and after storage. The results indicate that best results occurred from addition of about 0.3 to 0.4 percent of fluosilicic acid.

TABLE V
Effect of Storage on Vibrational Settling of Crystals

| Suspension grade | $H_2SiF_6$, % by wt. | Vibrational settling of crystals, % by vol. | |
|---|---|---|---|
| | | Before storage | After 30 days at 80° F. |
| 11.7-37.2-0 | 0.70 | 0 | 0 |
| 11.7-39.2-0 | 0.40 | 0 | 0 |
| 12.0-39.0-0 | 0.40 | 0 | 0 |
| 11.2-38.9-0 | 0.40 | 0 | 0 |
| 12.2-39.1-0 | 0.30 | 0 | 0 |
| 12.2-39.0-0 | 0.30 | 0 | 0 |
| 11.9-38.3-0 | 0.30 | 0 | 0 |
| 12.4-39.6-0 | 0.25 | 0 | 0 |
| 12.7-38.6-0 | 0.25 | 0 | 0 |
| 12.7-38.1-0 | 0.25 | 0 | 5.6 |
| 11.9-38.8-0 | 0.20 | 3.7 | 9.3 |
| 11.1-37.6-0 | 0.10 | 1.9 | 5.6 |

EXAMPLE VI

This example shows some of the high-analysis N—P₂O₅—K₂O suspensions that can be prepared from base suspension of 12-39-0 grade that contains 1.0 percent clay and 0.3 percent by weight of added $H_2SiF_6$. The N—P₂O₅ base suspension was prepared from Florida wet-process orthophosphoric acid by our two-stage ammoniation process operated under the conditions shown in Example I supra. The data (Table VI below) show that our high-grade base suspension can be mixed with nitrogen solution and potassium chloride to produce high-analysis mixed-grade products with various N:P₂O₅:K₂O ratios and good physical properties.

TABLE VI

Mixed-Grade Suspensions with Satisfactory Physical Properties from 12-38-0, 1.0 Percent Clay and 0.3 Weight Percent of $H_2SiF_6$, Urea-Ammonium Nitrate Solution (32 Percent N), and Potassium Chloride

| Suspension grade | N:P$_2$O$_5$ wt. ratio | Evaluation temp., °F. | Viscosity$^a$ at 80° F., cP | Pourability,$^b$ % by vol. | Settled crystals,$^c$ % by vol. |
|---|---|---|---|---|---|
| | | | After 14 days of storage at 80° F. | | |
| 20-20-0 | 1:1:0 | 80 | 700 | 100 | 0 |
|  |  | 32 | 1000 | 100 | 0 |
| 14-14-14 | 1:1:1 | 80 | 500 | 100 | 0 |
|  |  | 32 | 1000 | 100 | 0 |
| 5-15-30 | 1:3:6 | 80 | 400 | 100 | 0 |
|  |  | 32 | 600 | 100 | 0 |
| 24-12-0 | 2:1:0 | 80 | 200 | 100 | 0 |
|  |  | 32 | 300 | 100 | 0 |
| 20-10-10 | 2:1:1 | 80 | 300 | 100 | 0 |
|  |  | 32 | 500 | 100 | 0 |
| 16-8-16 | 2:1:2 | 80 | 200 | 100 | 0 |
|  |  | 32 | 400 | 100 | 0 |
| 24-8-8 | 3:1:1 | 80 | 300 | 100 | 0 |
|  |  | 32 | 800 | 100 | 0 |
| 18-6-12 | 3:1:2 | 80 | 100 | 100 | 0 |
|  |  | 32 | 300 | 100 | 0 |
| 15-10-15 | 3:2:3 | 80 | 300 | 100 | 0 |
|  |  | 32 | 600 | 100 | 0 |

$^a$Measurements were made with a Brookfield viscometer (Model LVT).
$^b$Pourability measured by turning container downward at a 45-degree angle and allowing 1 minute for the material to pour from the container.
$^c$Crystals that settled during quiescent storage.

After sifting and winnowing through the data supra, as well as other results of tests and operation of our new, novel, and improved method for production of suspension fertilizers from orthophosphoric acid, we now present the acceptable and preferred parameters and variables as shown below.

| | Operating range | Preferred (about) | Most Preferred |
|---|---|---|---|
| First Stage | | | |
| Feed acid$^a$, % P$_2$O$_5$ | 30–44 | 32–40 | 37–38 |
| Atomic ratio, F/metallic impurities | 0.4–1.5 | 0.7–1.2 | 0.9–1.1 |
| N:P$_2$O$_5$ wt. ratio | 0.15–0.28 | 0.20–0.26 | 0.20–0.23 |
| Temperature, °F. | 180–230 | 225–230 | Boiling |
| Retention time, minutes | 10–90 | 30–60 | 30–45 |
| Second Stage | | | |
| N:P$_2$O$_5$ wt. ratio | 0.26–0.34 | 0.27–0.33 | 0.28–0.32 |
| Temperature, °F. | 140–230 | 200–220 | 200–210 |
| Retention time, minutes | 5–30 | 10–20 | 10–15 |
| Cooler | | | |
| Temperature, °F. | 80–150 | 90–140 | 110–130 |
| Retention time, minutes | 5–60 | 10–20 | 10–15 |
| Clay Mixer | | | |
| Temperature, °F. | 80–150 | 90–140 | 110–130 |
| Retention time, minutes | 10–60 | 20–40 | 20–30 |
| H$_2$SiF$_6$ Addition, % of total wt. | 0.10–0.5 | 0.20–0.40 | 0.30–0.40 |
| Clay addition, % of total wt. | 0–3 | 0.5–2.0 | 1.0 |

$^a$Feed acid to first-stage reactor may be filter grade. If feed acid to first stage is of merchant grade strength, or higher concentration, it is diluted with water for feed acid concentration.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters Patent of the United States is:

1. A process for the production of suspension-type fertilizers from wet-process phosphoric acid and ammonia, which suspensions have high plant food contents, excellent flow properties, low viscosities, good storage properties, and do not contain settled crystals after exposure to substantial vibration, which process comprises the steps of:
   (1) simultaneously adding in predetermined proportions a stream of ammonia, of water, and of wet-process phosphoric acid to a first-stage reactor to effect a partially ammoniated feed phosphoric acid material therein having a N:P$_2$O$_5$ weight ratio ranging from about 0.15 to about 0.28;
   (2) removing at least a portion of the resulting partially ammoniated acid from said first-stage reactor and introducing same into a second-stage reactor, together with a stream of additional ammonia in predetermined proportions to effect an ammoniated phosphoric acid material therein having a N:P$_2$O$_5$ weight ratio ranging between about 0.26 to about 0.34;
   (3) removing at least a portion of said ammoniated material from said second-stage reactor and subsequently introducing same into cooling means wherein said ammoniated material is cooled to a temperature in the range from about 80° F. to about 150° F.;
   (4) subsequently removing the resulting ammoniated material from said cooling means and introducing same, at a temperature in the range from about 80° F. to about 150° F., to a mixing vessel, together with from about 0.5 percent to about 2 percent by weight clay and from about 0.1 percent to about 0.5 percent by weight fluosilicic acid, said fluosilicic acid based on the weight of the resulting stable suspension; and
   (5) removing the resultant stable suspension from said mixing vessel to storage.

2. The process of claim 1 wherein the proportioning of said streams of water and wet-process phosphoric acid in said first-stage reactor is controlled to effect a feed acid concentration therein ranging from about 30 to about 44 weight percent P$_2$O$_5$, and wherein the proportioning of said fluosilicic acid to said mixing vessel is controlled to effect in the resultant suspension a concentration of fluosilicic acid ranging from about 0.2 to about 0.4 weight percent.

3. The process of claim 1 wherein the proportioning of said acid and said water to said first-stage reactor is controlled to effect a feed acid concentration therein ranging from about 32 to about 40 percent P$_2$O$_5$ by weight and wherein the proportioning of said ammonia to said acid is controlled to effect a N:P$_2$O$_5$ weight ratio therein ranging from about 0.2 to about 0.26; wherein the proportioning of said additional ammonia to said second-stage reactor is controlled to effect a N:P$_2$O$_5$ weight ratio therein ranging from about 0.27 to about 0.33; and wherein the addition of said fluosilicic acid to said mixing vessel is controlled to effect in the resulting suspension a concentration of fluosilicic acid ranging from about 0.3 to about 0.4 weight percent.

4. The process of claim 1 wherein the ratio of said water to said wet-process phosphoric acid added to said first-stage reactor is proportioned to control said feed acid concentration therein ranging from about 37 to about 38 percent P$_2$O$_5$ by weight, wherein the ratio of said ammonia to said wet-process phosphoric acid in said first-stage reactor is proportioned to effect a N:P₂O₅ weight ratio in said first-stage reactor ranging from about 0.2 to about 0.23; wherein said stream of additional ammonia to said second-stage reactor is controlled to effect a N:P₂O₅ weight ratio therein ranging from about 0.28 to about 0.32; and wherein the fluosilicic acid introduced into said mixing vessel is proportioned with said resulting cooled ammoniated material introduced therein to effect a fluosilicic acid concentration in said resultant stable suspension of about 0.4 weight percent.

* * * * *